Nov. 13, 1951  W. P. KING  2,574,743
CHILD'S PERAMBULATOR AND AUTO SEAT
Filed July 8, 1946  2 SHEETS—SHEET 1
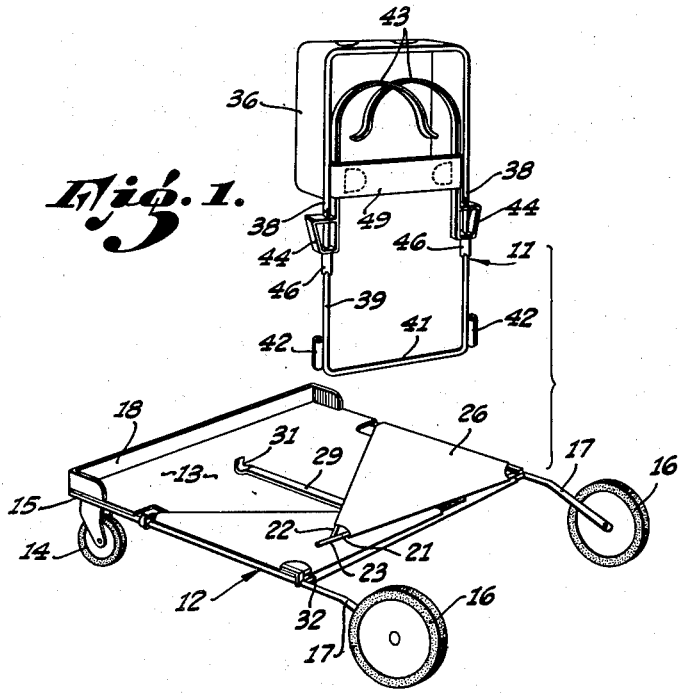
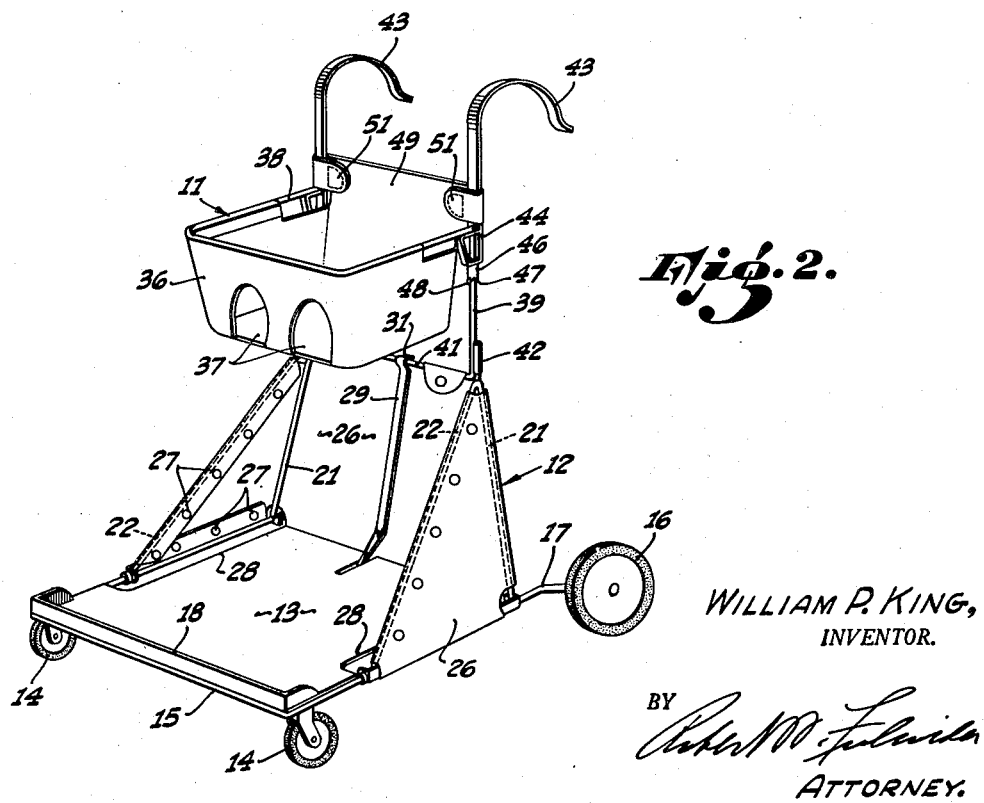
WILLIAM P. KING,
INVENTOR.
BY
ATTORNEY.

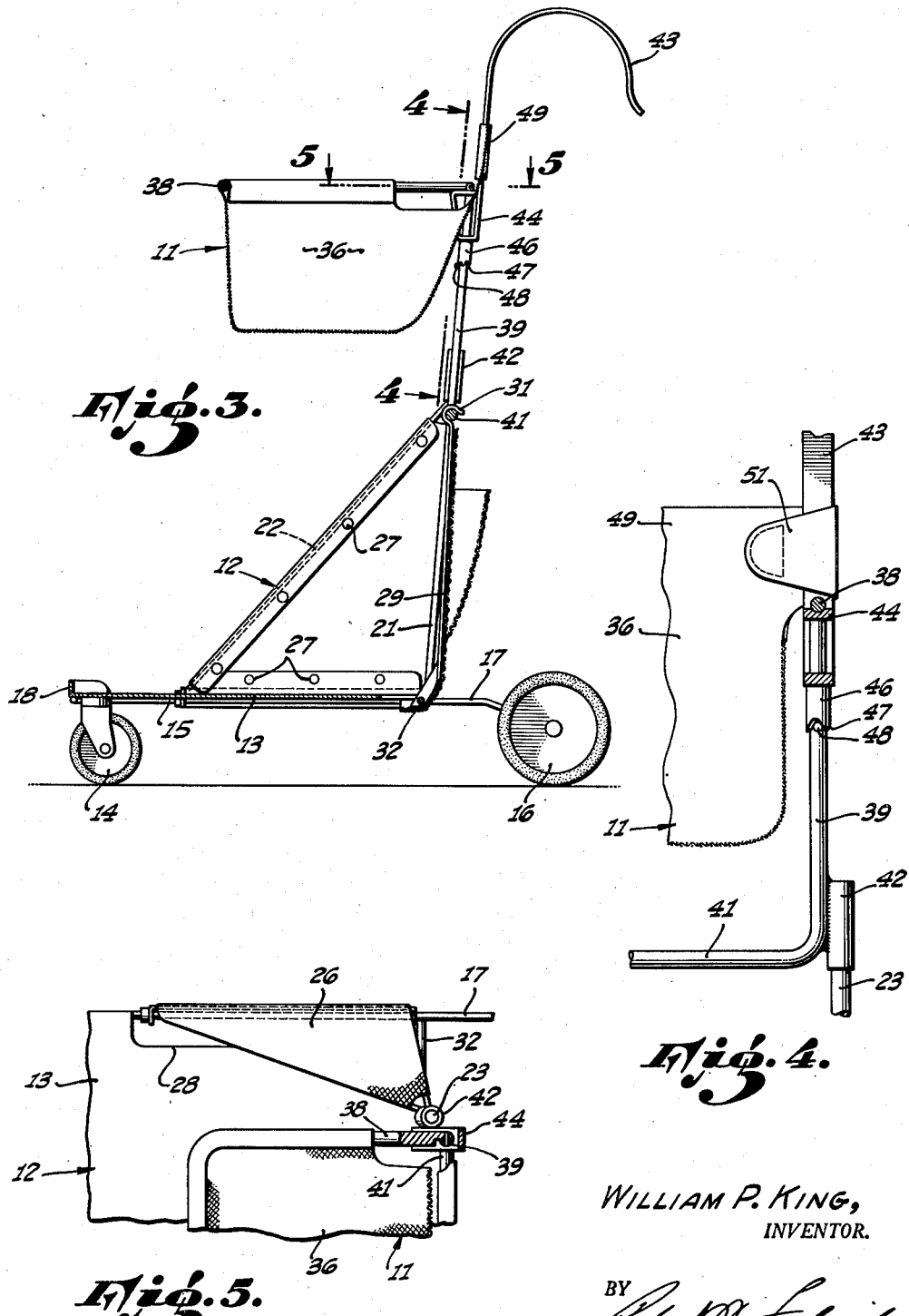

Patented Nov. 13, 1951

2,574,743

UNITED STATES PATENT OFFICE 2,574,743

CHILD'S PERAMBULATOR AND AUTO SEAT

William Perry King, Los Angeles, Calif.

Application July 8, 1946, Serial No. 682,107

7 Claims. (Cl. 155—41)

The present invention relates to perambulators in general and particularly to a section perambulator designed to be collapsed readily for storage purposes. More specifically, the invention comprises a collapsible two-part perambulator embodying a removable seat adapted to be mounted upon an automobile seat.

The perambulator constructed in accordance with the present invention embodies the functional capabilities common to the well-known seat type perambulator and has additional qualities which distinguish it. The ordinary baby carriage is a relatively bulky contrivance which, when not in use, too frequently occupies space better used for other purposes. Its size prevents its transportation in the family car and as a result it is usually left at home when the baby is taken on an auto trip. Additionally, the usual baby carriage is a relatively expensive vehicle. Because of these objectionable features a simpler, less expensive seat type perambulator has gained in popular favor.

As distinguished from earlier types, the perambulator constructed in accordance with the present invention is adapted to be taken apart easily, collapsed, and stored in a relatively small space in the trunk of an automobile so that it may be transported with the family when taking trips. Additionally, the seat proper is adapted to be mounted upon the seat of an auto and to serve as the child's seat. When in operation the unit has a platform or base suitable for carrying purchases such as groceries, etc. in a manner as not to interfere with the child or his freedom of movement.

It is an object of the present invention to provide a collapsible perambulator which embodies a removable child's seat adapted to be mounted in an automobile.

It is a further object of the invention to provide an ambulatory child's seat combined with an article storage space.

These and other more specific objects will appear upon reading the following specification and claims and upon considering in connection therewith the attached drawings.

Referring now to the drawings in which a preferred embodiment of the invention is illustrated:

Figure 1 is a view of the carriage disassembled, collapsed, and ready for storage;

Figure 2 is a view in perspective of the invention in operative relationship;

Figure 3 is a medial vertical section through the device;

Figure 4 is a partial section upon the line 4—4 of Figure 3; and

Figure 5 is a partial section looking in the direction of the arrows upon the line 5—5 of Figure 3.

Referring again to the drawings, the perambulator constructed in accordance with the present invention is seen to comprise a removable seat indicated generally by the reference character 11 and a wheel-supported base indicated generally by the reference character 12. In Figure 1 the two parts are shown disassembled and in Figure 2 in their cooperative relationship with the device ready for use. The ambulatory base 12 is seen to comprise a flat platform 13 which may be of sheet metal and which forms a suitable support for articles purchased while shopping. Swiveled wheels 14 are positioned below the forward corners of the platform 13 and rear wheels 16 are rotatably mounted at its rear on rigid rearwardly extending arms 17 of a metallic U-shaped member 15 which extends along the underside of the platform on three sides. A low forward wall 18 extends across the front of the platform on three sides to prevent articles from accidentally sliding therefrom, and also to serve as a bumper. Upon each of the two sides of platform 13 is a pair of rods 21 and 22 which are arranged as an inverted V and joined at their upper extremities to form a vertical post 23. A pliable fabric wall 26 extends around and between the two wishbone side frames formed by the pairs of arms 21 and 22 and is secured thereto by overlapping edges forming hems which enclose the rods 22 and portions of the arms 17, the base 13 being cut out at each side, as at 28, to enable the fabric to encircle the arm. The hems are releasably secured by snaps 27 in order that the wall may be removed and cleaned when desired.

Rods 21 and 22 are pivoted upon the arms 17 and are adapted to swing inwardly so as to lie one over the other and against the platform 13 as shown in Figure 1. When so positioned, the material of the wall 26 is folded between the frames. The base construction 12 is completed by the presence of a latch element 29 formed with an overturned or hooked end 31 and pivoted at its opposite end upon a cross rod 32 extended between the side arms 17 of U-frame 15. As will be explained, latch 29 functions to secure the seat 11 in place upon the base.

Turning now to the seat unit 11, it is seen to include a fabric pocket or seat proper 36 formed with two forwardly facing leg holes 37 and supported along its upper edge by a rigid U-shaped frame 38. The latter is pivoted at its rearward extremities to the upper ends of the legs of a second U-frame 39 which includes a bottom cross member 41. Sockets or sleeves 42 are permanently secured to the legs of frame 39 and are adapted to seat upon and enclose the posts 23 at the upper ends of the rods 21, 22 forming the pivoted side frames of the base. When so positioned, the frames mutually cooperate, frame 39 spacing the pivoted side frames of the base and holding them in fixed vertical position while the latter function to support the frame 39. Separation of seat unit 11 and base unit 12 is prevented by the latch 29, the hooked end 31 of which latches over the cross member 41 of frame 39.

A pair of handles at 43 are provided, each of which comprises a vertical main section having a rounded upper end so contoured as to be adapted to clamp to the top of the usual automobile front seat. The lower ends of the vertical portions of straps or handles 43 are folded back upon themselves to form brackets 44 through the top and bottom extensions of which the legs of U-frame 39 extend. Each bracket 44 is supported by a sleeve 46 rotatable upon the leg of frame 39 and formed at its lower end with stepped seats 47 adapted to rest selectively upon an abutment 48 formed on the frame leg. The top face of each bracket 44 is grooved, as shown most clearly in Figures 4 and 5, to form a cradle adapted to receive and support the sides of frame 38. With the frame 38 resting on the brackets the latter are prevented from turning and the handles are aligned in their operative positions, as shown in Figures 2 and 3. Additionally, the angularity of frame 38 relative to the frame 39 can be varied by rotating the sleeves 46 to change the seats 47 at their lower ends which rest upon the abutments 48, and so extend or fold brackets 44. This feature finds particular usefulness in adjusting the level of the seat unit 11 in an automobile and with the arms 43 resting over the top of the front seat, for the inclination of the seat varies in different cars.

The seat proper 36 is actually by the U-frame 38, as described, but in the preferred form the back thereof is extended upwardly between the handle arms 43 to provide a raised section 49 positioned by flaps 51 at its sides which enclose the arms 43.

The use and operation of the device constructed in accordance with the invention is believed to be clear from its construction. The child is positioned within the seat proper 36 with his legs extended through the apertures 37. The propelling force is exerted upon the arms 43, the overturned upper ends of which function conveniently as grips. The arms are prevented from turning by the brackets 44 which are themselves held by the weight of the child, the supporting frame 38 resting in the grooved upper surfaces of the brackets. With the base 12 of the vehicle secured to the seat unit 11 by the latch 29, the entire construction functions as a unit and the parts are held against separation. Any toys of the child which the parent desires to carry, or any parcels which are to be transported, may be placed upon the platform 13, the wall 26 forming an enclosure which prevents their displacement rearwardly while the low height front wall 18 performs the same function at the front end.

Should it be desirable to place a child in an automobile, the seat unit 11 is removable from the base 12 simply by releasing the latch 29 and lifting the child and seat upwardly, the sleeves 42 sliding from the vertical posts 23. The arms 43 may then be hooked over the back of the auto seat in a well-known manner to be retained by the weight of the child. The base 12 is collapsible by pivoting inwardly the wishbone side frames from the positions shown in Figure 2 to those shown in Figure 1. In the latter relationship, the base lies within relatively restricted limits and is adapted to be packed in the car trunk and transported.

The reassembly of the device is substantially a reverse operation from that described. Should it be desired to change the angular position of the seat-supporting frame 38, either with the seat positioned in the car or upon its own base, the adjustment is readily accomplished by the rotation of the sleeves 46 to select that seat 47 for cooperation with the abutment 48 which will give the desired adjustment.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a perambulator, an ambulatory base including a platform and spaced side walls pivotally mounted thereon and adapted to collapse thereagainst, and a child's seat unit removably positioned on said side walls, spaced above said platform to permit placement of packages on the latter and including means to retain said walls upright and upwardly extending handles adapted to function as supports when positioned on an auto seat.

2. In a perambulator, an ambulatory base including a platform with pivoted rigid side members swingable to a vertical position connected by a flexible fabric wall, a child's seat, an upwardly opening U-frame mounted on said side members and supporting said seat, and handles mounted on said U-frame.

3. A child's perambulator comprising an ambulatory base adapted to receive packages and including edge means to retain such packages in place and spaced rigid upright elements, a removable seat unit adapted to be mounted above said base and including a vertical frame having means to seat upon said uprights, a seat positioned forwardly of said frame, pivoted handles mounted on said frame and formed at their upper ends as supporting hooks, said handles being spaced above said base at a distance to provide easy access thereto by an adult standing erect being adapted to swing from positions parallel to the plane of said frame to positions at right angles thereto.

4. The construction recited in claim 3 characterized in that means are provided to raise and lower said seat relative to said frame.

5. The construction recited by claim 3 characterized in that said seat is pivotally mounted on said frame and is adapted to swing into the plane thereof for storage purposes.

6. The construction recited in claim 3 characterized in that said seat and said handles include cooperating means to lock said handles in one position with said seat in its normal position.

7. In a child's perambulator, a platform, wheels movably supporting said platform, side frame members mounted on said platform for pivotal movement between positions at right angles to and parallel to said platform, and a fabric closure wall secured to said frame members and extended therebetween, a portion of said fabric wall being adapted to collapse between said frames with said frames extended parallel to and against said platform, and to form back and side walls above said platform with said frames extended at right angles thereto.

WILLIAM PERRY KING.

REFERENCES CITED

The following references are of record in the file of this patent:

UNITED STATES PATENTS

| Number | Name | Date |
|---|---|---|
| 633,087 | Johnson | Sept. 12, 1899 |
| 673,334 | Casebolt | Apr. 30, 1901 |
| 1,297,006 | Peterson et al. | Mar. 11, 1919 |
| 2,291,640 | Lee | Aug. 4, 1942 |
| 2,347,754 | Shay | May 2, 1944 |
| 2,431,834 | Sinclair | Dec. 2, 1947 |
| 2,435,733 | Belyen | Feb. 10, 1948 |